UNITED STATES PATENT OFFICE.

JOSEPH RADFORD, OF PHILADELPHIA, PENNSYLVANIA.

IMPROVEMENT IN COMPOSITIONS FOR LIGHTING CIGARS.

Specification forming part of Letters Patent No. 177,001, dated May 2, 1876; application filed January 22, 1876.

*To all whom it may concern:*

Be it known that I, JOSEPH RADFORD, of Philadelphia, in the county of Philadelphia and State of Pennsylvania, have invented a new and valuable Improvement in Cigar-Lighter; and I do hereby declare that the following is a full, clear, and exact description of the same.

This invention has for its object the production of an economical and otherwise useful compound with which to saturate the ends of small pieces of wood, for the purpose of lighting cigars; and the nature of my invention consists in a compound formed of the ingredients mixed together in about the proportions hereinafter set forth.

*Formula.*—Pulverized charcoal, two (2) parts; wheat-flour, one (1) part; chlorate potash, one (1) part. These substances are mixed together with vinegar, (acetic acid,) and the solution thinned by adding the proper quantity of water to it.

It will be observed that I use pulverized charcoal as one of the ingredients of my new compound. This I have found will not mix with water, but requires an acid, and vinegar is the best and least expensive acid that could be used for the purpose, and enables me to use charcoal, which retains the live spark so long.

What I claim as new, and desire to secure by Letters Patent, is—

A composition consisting of pulverized charcoal, wheat-flour, chlorate potash, and diluted vinegar or acetic acid, for the purpose herein set forth.

In testimony that I claim the above I have hereunto subscribed my name in the presence of two witnesses.

JOSEPH RADFORD.

Witnesses:
CHAS. F. VAN HORN,
D. D. KANE.